United States Patent [19]

Hasslauer et al.

[11] Patent Number: 4,742,740

[45] Date of Patent: May 10, 1988

[54] AUTOMATIC ROD GUIDE ADJUSTING METHOD FOR A NUMERICALLY CONTROLLED LATHE AND LATHE FOR CARRYING OUT THE METHOD

[75] Inventors: Heinz Hasslauer, Uhingen; Werner Frey, Ebersbach; Werner Sonnek, Lichtenwald; Walter Klauss, Adelberg, all of Fed. Rep. of Germany

[73] Assignee: Traub AG, Fed. Rep. of Germany

[21] Appl. No.: 940,541

[22] Filed: Dec. 11, 1986

[30] Foreign Application Priority Data

Feb. 5, 1986 [DE] Fed. Rep. of Germany ....... 3603561

[51] Int. Cl.⁴ ............................................. B23B 13/00
[52] U.S. Cl. ......................................... 82/2.5; 82/30; 82/40 R
[58] Field of Search ................... 82/2.5, 2.7, 30, 38 R, 82/40 R

[56] References Cited

U.S. PATENT DOCUMENTS

| | | | |
|---|---|---|---|
| 1,250,660 | 12/1917 | Rivett | 82/30 |
| 3,162,315 | 12/1964 | Holden | 82/2.5 |
| 3,592,090 | 7/1971 | Koopman | 82/30 |
| 3,824,884 | 7/1974 | Gilbert et al. | 82/30 |
| 3,910,476 | 10/1975 | Zajac | 82/2.5 |
| 4,324,162 | 4/1982 | Uehara | 82/2.5 |

FOREIGN PATENT DOCUMENTS 2541644 3/1977 Fed. Rep. of Germany .

Primary Examiner—Frederick R. Schmidt
Assistant Examiner—William E. Terrell
Attorney, Agent, or Firm—Webb, Burden, Robinson & Webb

[57] ABSTRACT

A controlled lathe having a rotatable main spindle with a hollow interior and a plurality of radially adjustable guide bodies for guiding a rod having a portion located within the hollow interior of the main spindle. Each guide body rests on a support body and is adjustable with respect to the support body by an axially movable inner tube located within the hollow interior of the main spindle. Axial movement of the inner tube to adjust the guide bodies is effected by an adjusting member which is mounted on the end of the inner tube and which is rotatable with the main spindle during normal lathe operation. The adjusting member is threadedly connected to a member which is attached to the main spindle, and a holding device secures the adjusting member against rotation when the guide bodies are to be adjusted which causes axial movement of the adjusting member and the inner tube due to the threaded connection. The axial position of the inner tube and the radial position of the guide bodies is varied by controlled rotation of the main spindle while the adjusting member is secured against rotation.

11 Claims, 3 Drawing Sheets

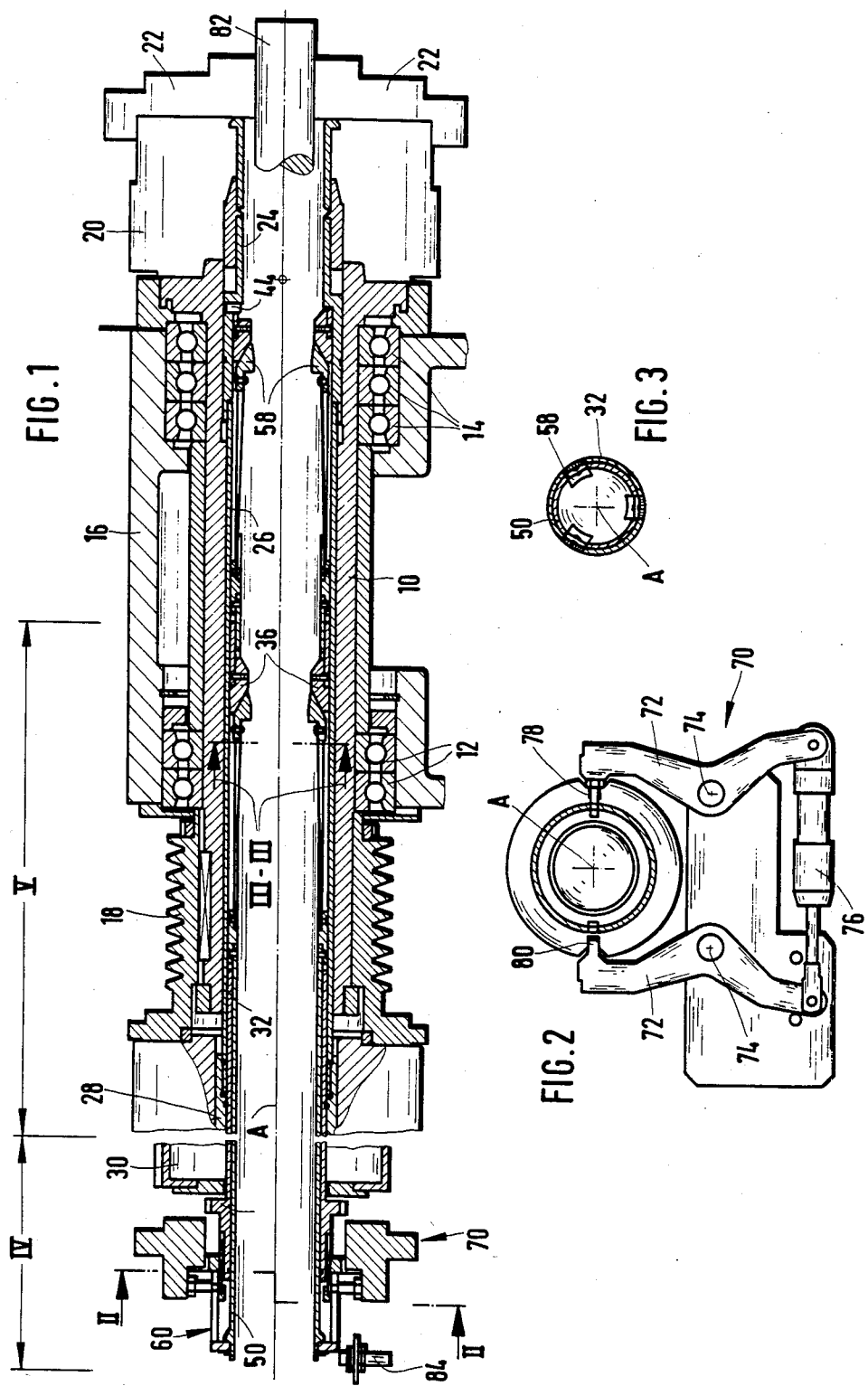

FIG. 4
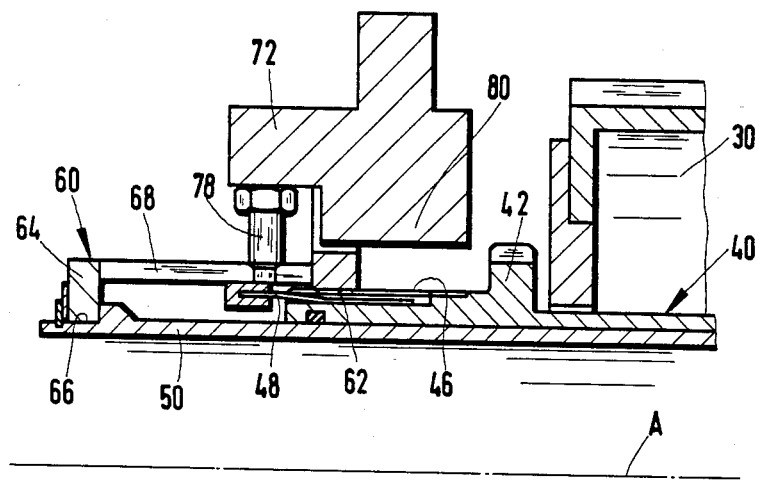
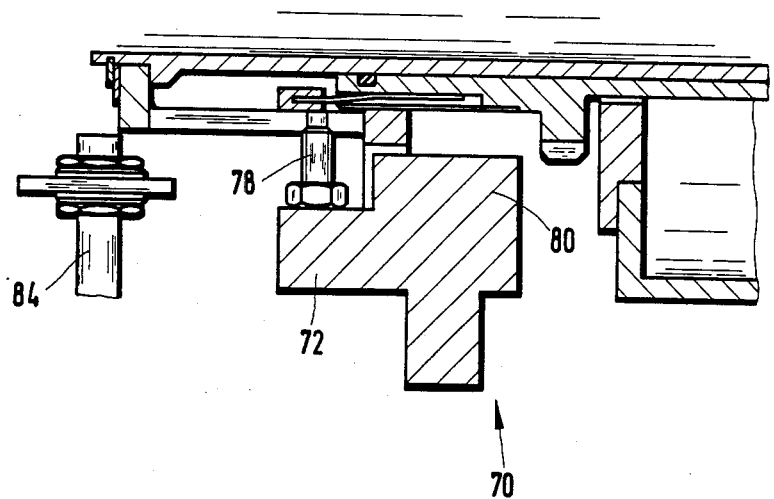

AUTOMATIC ROD GUIDE ADJUSTING METHOD FOR A NUMERICALLY CONTROLLED LATHE AND LATHE FOR CARRYING OUT THE METHOD

The instant invention relates to a method of automatically adjusting a rod guide means in a numerically controlled lathe working on rods, comprising a hollow main spindle, guide bodies for guiding a work rod in the interior of the main spindle, support bodies on which the guide bodies rest, an inner tube which extends into the main spindle with which it is connected for joint rotation but remains axially adjustable to effect axial relative movement of the guide bodies and support bodies with respect to each other, thereby adapting the position of the guide bodies in radial direction to a cross sectional dimension of the work rod, and an adjusting member which likewise is rotatable together with the main spindle during normal operation of the lathe and is adapted to carry out relative movement with respect to the main spindle for axial adjustment of the inner tube.

A turning machine or lathe comprising the features recited above is known from DE-A No. 2 541 644. In the known machine the adjusting member is embodied by a sleeve having a flange and, for axial adjustment, it is connected to the piston of a hydraulic piston and cylinder unit, the cylinder being stationary and coaxial with the main spindle. The axial adjustment of the adjusting member is limited by a rotatable disc which is supported parallel to the main spindle and can be turned into different angular positions of rotation by a separate motor. The motor is controlled by a scanning device acting through a potentiometer and being mounted on a rod supply means to measure the diameter of the respective rod to be worked on and to be introduced into the main spindle. The motor turns the disc into a rotary angle position in response to the diameter measured. Stops of different lengths are fastened at the disc, and one of these stops in each angular position of rotation limits the movement of the adjusting member.

In this manner care is taken, with the known lathe, that a specific adjustment of the adjusting member and consequently of the inner tube and of the guide bodies as well corresponds to a respective one of different diameters of the work rods which are to be guided in the main spindle. This known arrangement requires great structural expenditure and it needs all the more space the greater the number of stops on the disc and thus the number of diameters of work rods to which the radial spacings of the guide bodies from the geometric axis of the main spindle are adjustable. Therefore, for practical reasons it is indispensable to limit the adjustment of the guide bodies to different rod diameters to but a few steps and put up with the fact that on the average the work rods are being guided with considerable clearance. Thus vibrations of the work rods in the main spindle in general cannot be avoided as much as desired from the point of view of smooth running and high-quality performance of the machine which is linked to that factor.

It is, therefore, an object of the instant invention to provide a numerically controlled lathe working on rods, of the kind specified initially, with simple and space-saving means for sufficiently accurate adjustment of the position of the guide bodies in the main spindle to avoid disturbing vibrations.

This object is met, in accordance with the invention in that a controlled rotation of the main spindle is translated into an axial displacement of the adjusting member proportional to the rotation, while the adjusting member is held fixed against rotation.

In this manner the angle control of the main spindle with which CNC turning machines are equipped anyway is utilized for adjustment of the guide bodies to guide a rod to be worked on, the guide bodies being adapted to a cross sectional dimension of the work rod. In the case of work rods having a round cross section, the decisive cross sectional dimension is the diameter. Yet it is possible as well to adjust the guide bodies by the method of the invention in accordance with work rods of non-circular cross section. In the case of work rods of square or hexagonal cross sections, for instance, the decisive cross sectional dimension for adjusting the guide bodies is the width over flats of the cross section.

Fixed programming in the manner which is usual with C-axis control may be provided for the instructions of rotations to be carried out by the main spindle for displacing the adjusting member and thus the guide bodies in accordance with the invention, with the adjusting member itself being held fixed against rotation. It is conceivable as well to make such commands dependent on measurements being taken of the work rods prior to their entry into the main spindle.

Regardless of whether and how the decisive cross sectional dimension of the work rods is measured, it is convenient to turn the main spindle into a predeterined angular position before any work rod of different cross sectional dimension is introduced, while the adjusting member is retained in an angular position which likewise is predetermined. In this manner a certain reference position of the guide bodies is established and, based on this position, any adjustment which is either preprogrammed or dependent on a measuring result can be effected easily and in exactly reproducible manner.

The predetermined angular position of the main spindle preferably is the position at which the guide bodies are adjusted to the maximum possible work rod diameter.

The invention also relates to a numerically controlled lathe working on rods, of the generic kind specified initially. Such a lathe is developed further, in accordance with the invention, in that a rotary angle control means (C axis control) is associated in per se known manner with the main spindle, that the adjusting member, forming part of a screw thread drive means between the main spindle and the inner tube, is connected to one of these two structural members by a pair of threads and to the other one for relative rotation but for joint axial displacement, and that a controlled holding device is associated with the adjusting member for retaining the adjusting member in at least one defined angular position of rotation.

A lathe designed in this manner in accordance with the invention is of much simpler structure than the known lathe of the generic type in question. It hardly requires any additional structural expenditure as compared to known lathes with C-axis control and manual adjustment only of the guide bodies because the source of energy for moving the adjusting member and thus the guide bodies already is available in the form of the drive means for rotating the main spindle. Additional usage of the C-axis control for adjusting the guide bodies in response to varying cross sectional dimensions of the work rods does not make this control any more complex than it is anyway. The only additional expenditure which, however, is rather inconsiderable in manufacturing a lathe according to the invention must be made for the controlled holding device which serves to prevent rotation of the adjusting member until the desired adjustment of the guide bodies has been reached by controlled rotation of the main spindle.

In a convenient embodiment of the invention the adjusting member is carried by the inner tube somewhat like a cap screw, and it is screw coupled to a threaded member which is in firm connection with the main spindle.

The threaded member conveniently is formed as an extension of an intermediate tube which encloses the inner tube in a sliding fit.

Furthermore, it is advantageous to form the intermediate tube and the inner tube with longitudinal slots within the main spindle, which slots overlap each other at least in part and each contain part of a guide body and of a support body.

The structural embodiment described of the adjusting member as a kind of cap screw and/or the arrangement of guide and support bodies within longitudinal slots formed in the inner tube and of an intermediate tube may be applied advantageously also with turning machines of the generic kind in question which are not yet equipped with C-axis control and thus require the relative rotation between main spindle and adjusting member needed for adjustment of the guide bodies to be effected in different manner, particularly manually.

In accordance with another feature of the invention the controlled holding device preferably is designed such that it grasps the adjusting member like tongs.

The adjusting member may be formed with two diametrically opposed longitudinal slots and the holding device may comprise two claws designed for engagement in these longitudinal slots.

Finally, it is convenient, during normal operation, if the adjusting member is prevented from making relative movement with respect to the main spindle by at least one blocking device which is releasable by the holding device. This permits the threaded drive between the main spindle and the inner tube to be of easy motion without presenting the risk of any unintentional adjustment.

The invention will be described further, by way of example, with reference to the accompanying drawings, in which:

FIG. 1 is a longitudinal sectional elevation of a spindle arrangement in a lathe working on rods;

FIG. 2 is a cross sectional elevation along lines II-II of FIG. 1;

FIG. 3 is a part sectional elevation along lines III-III of FIG. 1;

FIG. 4 is an enlarged view of the section marked IV in FIG. 1;

Figure 5:
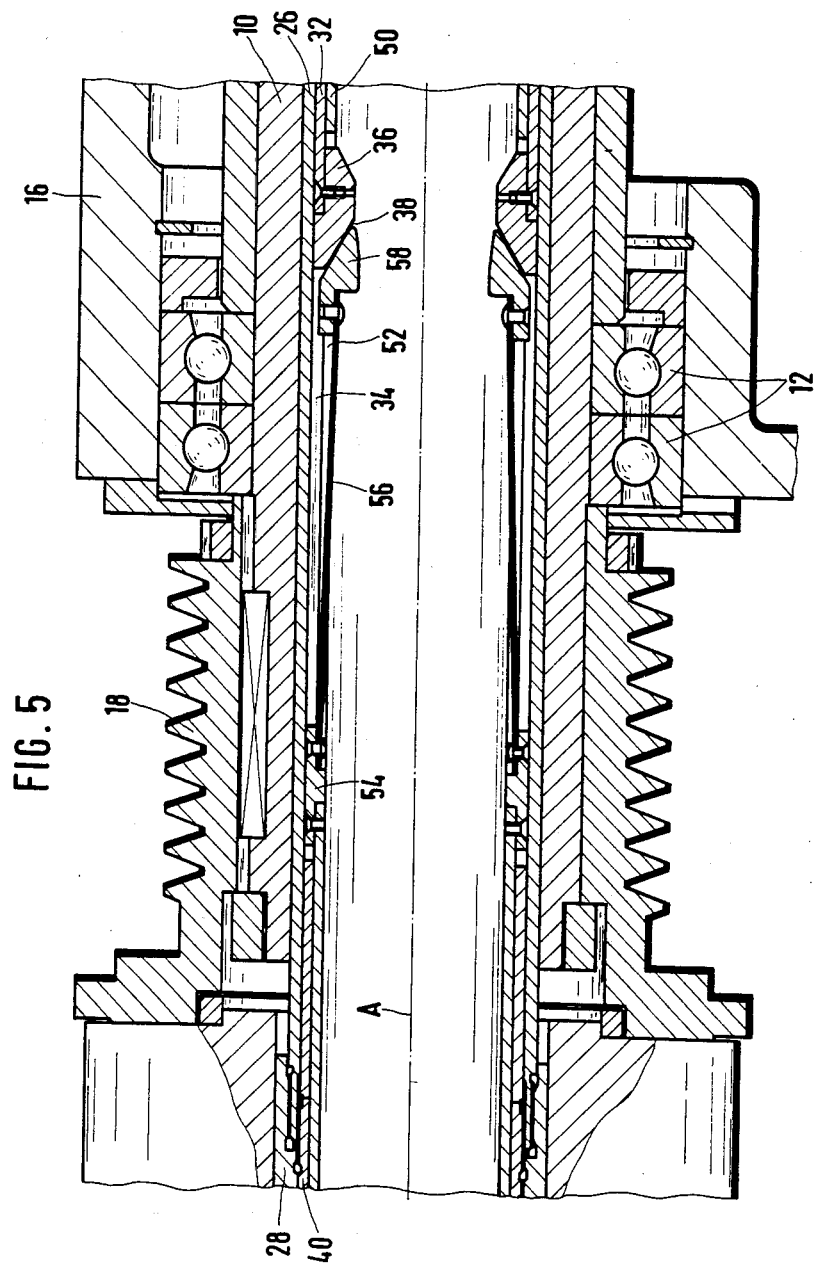
FIG. 5 is an enlarged view of the section marked V in FIG. 1.

The spindle arrangement shown comprises a main spindle 10 which is supported for rotation about a spindle axis A but fixed against axial displacement in a headstock 16 by means of bearings 12 and 14, in a manner which is customary with turning machinery. A pulley 18 is fixed on the main spindle so as to connect the same to a drive motor (not shown). The angle of rotation and the rotary speed of the drive motor and thus also that of the main spindle 10 are controlled numerically. This control usually is referred to as C-axis control.

A chuck or face plate 20, likewise of conventional design, is fastened at the front end, in FIG. 1 the right end, of the main spindle 10 and comprises three or four jaws 22 which are relatively offset by 120° or 90° respectively. The jaws 22 are operable by a clamping sleeve 24 and a clamping tube 26 which is screw coupled to the clamping sleeve and axially movable in the main spindle by means of a hollow clamping piston 28 which is arranged in an hydraulic clamping cylinder 30. The clamping tube 26 just like the face plate 20 and the clamping piston 28 are connected with the main spindle 10 for joint rotation.

An intermediate tube 32 formed with a plurality of axially spaced groups of slots, the embodiment shown including two groups of longitudinal slots 34 which are offset angularly, is disposed inside the clamping tube 26 and likewise rotatable together with the main spindle 10. A support body 36 is fastened at the intermediate tube 32 at the front end of each longitudinal slot 34. Each support body 36 has a wedge surface 38 at its rear end, being the left side in FIG. 1. A tubular threaded member 40 borders on the left end of the intermediate tube 32 and is threaded firmly into the clamping piston 28 whereby the threaded member and the intermediate tube are prevented from making any relative movement with respect to the clamping piston and clamping tube 26. Assembly and disassembly of the threaded member 40 is effected by means of a hooked spanner or wrench engaging corresponding faces of a flange 42 formed on the threaded member. Relative rotation of the intermediate tube 32 with respect to the clamping tube 26 and thus the main spindle 10 is prevented by a radial bolt 44 disposed at the front end of the intermediate tube 32.

In its tail area the threaded member 40 includes an outer thread 46 of small pitch, for instance 1.0 mm per turn. Furthermore, the threaded member 40 carries a plurality of blocking devices 48 which are offset angularly with respect to each other and each is composed of a leaf spring riveted to the threaded member and a block attached to the free end of the leaf spring.

An inner tube 50 formed with longitudinal slots 52 is disposed inside the intermediate tube 32. These longitudinal slots each coincide with one of the longitudinal slots 34 of the intermediate tube 32 and each embraces one of the support bodies 36 such that the inner tube 50 is connected with the intermediate tube 32 for joint rotation but remains axially displaceable with respect to the same. Similar effect is established by fitting pieces 54 which are fastened at the rear end, in FIG. 1 being the left end, of each longitudinal slot 52 of the inner tube 50 and each carry a leaf spring 56 extending forwardly in the corresponding longitudinal slot 52 and carrying a wedge-shaped guide body 58 at its front end.

The guide bodies 58 each are coordinated with a respective one of the support bodies 36. When the inner tube 50 is in a rear terminal position, being the left one in FIG. 1, with respect to the intermediate tube 32 each of the guide bodies 58 substantially is received in the two corresponding longitudinal slots 34 and 52 so that it does not project radially inwardly beyond the corresponding support body 36. Now, if the inner tube 50 is moved forwardly with respect to the intermediate tube 32, each guide body 58 will slide on the wedge surface 38 of the corresponding support body 36 and thus be urged radially inwardly. Consequently, the intermediate space which remains free between associated guide bodies 58 becomes restricted.

An adjusting member 60 is provided for axially moving the inner tube 50 with respect to the intermediate tube 32. This adjusting member is designed like a cap screw and has an inner thread 62 which is screw coupled from behind with the outer thread 46 of the threaded member 40. The adjusting member 60 is formed at its rear end with a flange 64 which projects radially inwardly and engages in an annular groove 66 in the rear end area of the inner tube 50. In this manner the adjusting member is connected for rotation with the inner tube 50 but cannot be moved axially with respect to the same. The annular groove 66 may be defined at either side or at one side only, as shown, by a ring which is fixed to the inner tube 50. The adjusting member 60 is formed with paraxial longitudinal slots 68 between the inner thread 62 and the flange 64.

The adjusting member 60 may be retained by a holding device 70 in angular positions of rotation which are predetermined by the longitudinal slots 68 without, however, being impeded in its axial movement. The holding device 70 is designed like tongs and comprises a pair of double-armed levers 72 each being supported on a stationary pivot 74 extending parallel to the axis of the main spindle 10. At their ends remote from the adjusting member 60 the levers are interconnected by an hydraulic or pneumatic piston and cylinder unit 76. An adjustable threaded bolt 78 which is radial with respect to the adjusting member 60 is attached and a claw 80 formed at the other end of each of the two levers 72 adjacent the adjusting member 60.

During normal operation of the lathe furnished with the spindle arrangement as shown the holding device 70 is open so that the adjusting member 60 is rotatable together with the main spindle 10. However, if the spacing of the guide bodies 58 from the spindle axis A is to be increased or decreased for adaptation to a work rod 82 having a certain cross sectional dimension, especially a certain diameter or a certain width over flats, the piston and cylinder unit 76 is extended so that the ends of the levers 72 each equipped with a threaded bolt 78 and a claw 80 will approach each other, the threaded bolt 78 displacing the blocking devices 48 radially inwardly out of the longitudinal slots 68, thereby releasing the adjusting member 60. Immediately afterwards the claws 80 will be engaged in the longitudinal slots 68 such that the adjusting member is retained against any rotary movement.

Subsequently the main spindle 10 is turned in controlled manner by the C-axis control such that the threaded drive means formed by the threaded member 40 with its outer thread 46 and the adjusting member 60 with its inner thread 62 will cause forward or backward displacement of the inner tube 50. Hereby the guide bodies 58 sliding up further on the wedge surfaces 38 of the support bodies 36 or sliding down, as the case may be, will be set to their new desired distance from the spindle axis A.

Starting from the former position of the guide bodies 58, the new adjustment may be obtained either directly or, preferably, by first moving the adjusting member 60 and along with it the inner tube 50 to a defined reference position and subsequently to the new operating position.

In the embodiment shown, the reference position is defined by the adjusting member 60 comprising a mark, for instance in the form of a magnet attached to the adjusting member and a non-contact limit switch 84 coordinated with said mark.

What is claimed is:

1. A controlled lathe for turning rods (82), said lathe having a rotatable main spindle (10) with a hollow interior, means (18) on the exterior of said main spindle (10) to rotate said main spindle (10), an inner tube (50) extending into said hollow interior of said main spindle (10) and connectable to said main spindle (10) for rotation with said main spindle (10), a plurality of radially adjustable guide bodies (58) mounted on said inner tube (50) in said hollow interior of said main spindle (10) adapted to guide a rod (82) to be turned having a portion located within said hollow interior of said main spindle (10), said inner tube (50) being axially movable relative to said main spindle (10) to move said guide bodies (58) in the radial direction according to the cross sectional dimension of a rod (82) to be turned, an adjusting member (60) mounted on said inner tube (50) and rotatable with said main spindle (10) during normal operation of the lathe and movable axially relative to said main spindle (10) to axially adjust said inner tube (50) prior to the beginning of a normal operation of the lathe, said adjusting member (60) including a screw thread drive means (62), a screw thread drive means (42) on said main spindle (10) threadedly engaged with said screw thread drive means (62) on said adjusting member (60) to move said inner tube (50) axially, means (48) for operatively connecting said adjusting member (60) to said main spindle (10) for rotational movement with said main spindle (10) but not for axial movement relative to said main spindle (10) during normal operation of the lathe, a holding device (70) for temporarily retaining said adjusting member (60) in an angular position of rotation during a controlled rotation of said main spindle (10) prior to the beginning of a normal operation of the lathe so that said adjusting member (60) can move axially relative to said main spindle (10) to adjust said guide bodies (58) but cannot rotate with said main spindle (10).

2. A lathe as set forth in claim 1 wherein said screw thread drive means (42) on said main spindle (10) is on a threaded member (40) which is connected to said main spindle (10) for rotation with said main spindle (10).

3. A lathe as set forth in claim 2 including an intermediate tube (32) enclosing said inner tube (50) and attached to said main spindle (10) for rotation with said main spindle (10) and said threaded member (40) is formed as an extension of said intermediate tube (32).

4. A lathe as set forth in claim 3 wherein said intermediate tube (32) and said inner tube (50) are formed with longitudinal slots (34 & 52, respectively) within said hollow interior of said main spindle (10), at least a part of each slot (52) in said inner tube (50) overlapping at least a part of a slot (34) in said intermediate tube (32) and each pair of overlapping slots (34 & 52) containing a portion of a guide body (58) and a portion of a support body (36).

5. A lathe as set forth in one of claims 2 to 4 wherein said holding device (70) has a pair of pivotally mounted levers (72) having means (78) on one end for grasping said adjusting member (60) and means (76) on the other end for pivoting said levers (72).

6. A lathe as set forth in claim 5 wherein said adjusting member (60) is formed with two diametrically opposed longitudinal slots (68) and said means (78) on one end of said levers (72) of said holding device (70) for grasping said adjusting member (60) is a claw (80) having an adjustable bolt (78) to engage a logitudinal slot (68) in said adjusting member (60), whereby said bolts (78) engage said slots (68) to prevent rotation of said adjusting member (60).

7. A lathe as set forth in claim 1 including at least one blocking device (48) resiliently mounted on said main spindle (10), said blocking device (48) contacts with adjusting member (60) during normal operation of the lathe to lock said adjusting member (60) to said main spindle (10) for rotation with said main spindle (10), whereby said resiliently mounted blocking device (48) is releasable from said adjusting member (60) by said holding device (70) for axial movement of said inner tube (50).

8. A lathe as set forth in claim 2 including at least one blocking device (48) resiliently mounted on said main spindle (10), said blocking device (48) contacts said adjusting member (60) during normal operation of the lathe to lock said adjusting member (60) to said main spindle (10) for rotation with said main spindle (10), whereby said resiliently mounted blocking device (48) is releasable from said adjusting member (60) by said holding device (70) for axial movement of said inner tube (50).

9. A lathe as set forth in claim 3 including at least one blocking device (48) resiliently mounted on said main spindle (10), said blocking device (48) contacts said adjusting member (60) during normal operation of the lathe to lock said adjusting member (60) to said main spindle (10) for rotation with said main spindle (10), whereby said resiliently mounting blocking device (48) is releasable from said adjusting member (60) by said holding device (70) for axial movment of said inner tube (50).

10. A lathe as set forth in claim 4 including at least one blocking device (48) resiliently mounted on said main spindle (10), said blocking device (48) contacts said adjusting member (60) during normal operation of the lathe to lock said adjusting member (60) to said main spindle (10) for rotation with said main spindle (10), whereby said resiliently mounted blocking device (48) is releasable from said adjusting member (60) by said holding device (70) for axial movement of said inner tube (50).

11. A lathe as set forth in claim 5 including at least one blocking device (48) resiliently mounted on said main spindle (10), said blocking device (48) contacts said adjusting member (60) during normal operation of the lathe to lock said adjusting member (60) to said main spindle (10) for rotation with said main spindle (10), whereby said resiliently mounted blocking device (48) is releasable from said adjusting member (60) by said holding device (70) for axial movement of said inner tube (50).

* * * * *